United States Patent [19]

Aman

[11] 4,189,386
[45] Feb. 19, 1980

[54] DEBRIS SEPARATION AND DISPOSAL SYSTEM

[76] Inventor: Arcadio J. Aman, 2310 Bell Dr., Reading, Pa. 19609

[21] Appl. No.: 948,260

[22] Filed: Oct. 3, 1978

[51] Int. Cl.² .............................................. B01D 35/08
[52] U.S. Cl. ................................. 210/235; 37/183 R; 210/237; 210/241; 210/244; 210/264; 210/274; 414/624
[58] Field of Search ............... 210/237, 152, 153, 171, 210/232, 235, 237, 241, 249, 244, 348, 359, 464, 473, 474; 37/183 R-188; 214/656, 657

[56] References Cited

U.S. PATENT DOCUMENTS

| | | | |
|---|---|---|---|
| 1,091,947 | 3/1914 | Morgan | 210/237 |
| 1,178,355 | 4/1916 | Stein | 210/237 |

*Primary Examiner*—Frank Sever
*Attorney, Agent, or Firm*—M. Richard Page

[57] ABSTRACT

A system for the removal and disposal of debris from the water intake of power plants or the like is disclosed. The system includes a strainer basket having pivoted, separable sections movable from an abutting position to an open position; the sections are biased to the abutting position, in the preferred form, by gravitational forces acting upon the basket sections and their contents. The system further includes structure for opening the separable portions of the basket to empty the contents into a suitable disposal receptacle; a preferred opening device is a member adapted to be positioned on the debris-receiving receptacle and having cam surfaces for separating the basket sections. The system contemplates placement of the strainer basket in a bellow-ground location and a hoist for lifting the basket for emptying.

13 Claims, 16 Drawing Figures

DEBRIS SEPARATION AND DISPOSAL SYSTEM

BACKGROUND OF THE INVENTION

This invention deals with the separation of solid materials from a stream of fluid; more particularly, the straining of leaves, branches and other debris from river water before its use for cooling purposes in power generating plants, factories and the like.

Nearly all power generating plants require large quantities of water for condenser cooling purposes. As a result, many plants, especially those powered by fossil fuels, are located near rivers in order to take advantage of the plentiful supply of water. Before river water can be used to cool power generating equipment, however, the leaves, branches and other debris present in it must be removed. There are several currently employed methods of achieving this result. Each suffers from disadvantages over which the present invention offers substantial improvement. In typical existing systems used to strain debris from river water, the water flows through an intake tunnel and first passes through a set of bars which trap tree branches and other large debris. These bars are cleaned by lifting rakes whereupon the branches, etc., are hauled away for disposal. The water next passes through a moving conveyor-like screen which traps leaves and other small debris. To prevent clogging, the traveling screen continuously transports the trapped material from the river water flow past a jet of backwash water that dislodges the material from the screen into a trough.

The backwash water and debris from these systems may be returned to the river; however, where the return of the debris to the river is not desired, as in response to governmental regulations prohibiting such disposal, the debris must be separated from the backwash by another straining system so that it may be hauled away for further land disposal.

One system for separating debris from the backwash water utilizes a moving endless fine screen that traps the debris and carries it past a wire cleaning brush that dislodges the debris so that it will fall into a container or receptacle. To prevent freezing of the water and debris during cold weather operation, a canopy and heater are required. These systems, although reasonably effective, are complicated in construction and require continuous power to operate the screen and to heat the unit during freezing weather.

Other systems use basket-type strainers adapted to trap the debris in a fluid flow, allowing the clean water to drain and return to the river. The basket-type strainer must be periodically removed from the intake flow and emptied of debris. To facilitate emptying, the baskets are adapted to release their contents from the underside, through a hinged bottom panel. One of the disadvantages of these systems is that they require latches to secure the doors in the closed position while the basket is in use. The latching systems are easily clogged by debris, freeze during cold weather, and are damaged by workmen attempting to operate them. especially while clogged or frozen. Apart from maintenance difficulties, the latches add cost and complexity to the construction and necessitate additional steps in emptying the baskets.

Accordingly, it is an object of this invention to provide a bottom-emptying straining device which does not require latches or other mechanical fasteners to secure it in the closed position during straining.

Another object of this invention is to provide a straining device of the type described which will operate during freezing weather without the need for artifical heating.

Another object of this invention is to provide a straining device of the type described which is inexpensive, simple in construction and operation, and maintenance-free.

Further objects and advantages will become apparent from the following description and accompanying drawings.

SUMMARY OF THE INVENTION

The present invention achieves the objects set forth above by providing a strainer basket comprising two abutting perforate sections mounted in such a manner as to be self-closing, and preferably in a manner so that the weight of the sections, and of any trapped material, urges the sections closed, thus eliminating the need for latches or other fasteners. The self-closing basket may be emptied from the underside by rotating one or both of the sections about their respective mounting means, thus disengaging the sections from abutment and dumping the contents. The preferred method of disengaging the sections is to provide each with a set of cam-following surfaces adapted to engage a cam which forces the half sections to rotate with respect to each other. Where the cam-following surfaces are pins mounted on the ends of each section and the cam is a wedge adapted to open the basket by driving each pair of pins apart, an additional advantage is achieved in that the weight of the basket and contents further urges such opening.

To prevent freezing of the water and debris during cold weather, the basket may be adapted to operate in an underground pit, thus taking advantage of the more moderate ground temperatures.

Lifting means are provided to remove the filled basket from the pit and facilitate the emptying of its contents into a receptacle.

DESCRIPTION OF THE PREFERRED EMBODIMENT

Figure 1:
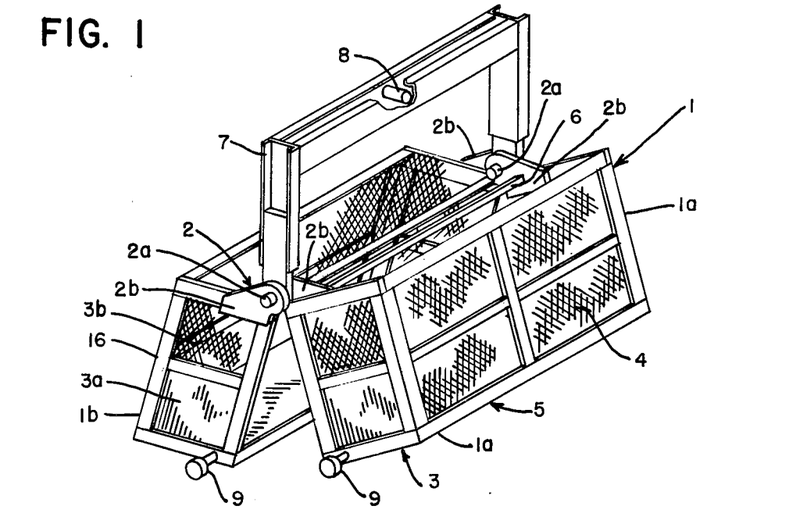
FIG. 1 illustrates the straining basket of the present invention in a partially opened position.
Figures 4A, 4B, 4C, 4D, 5:
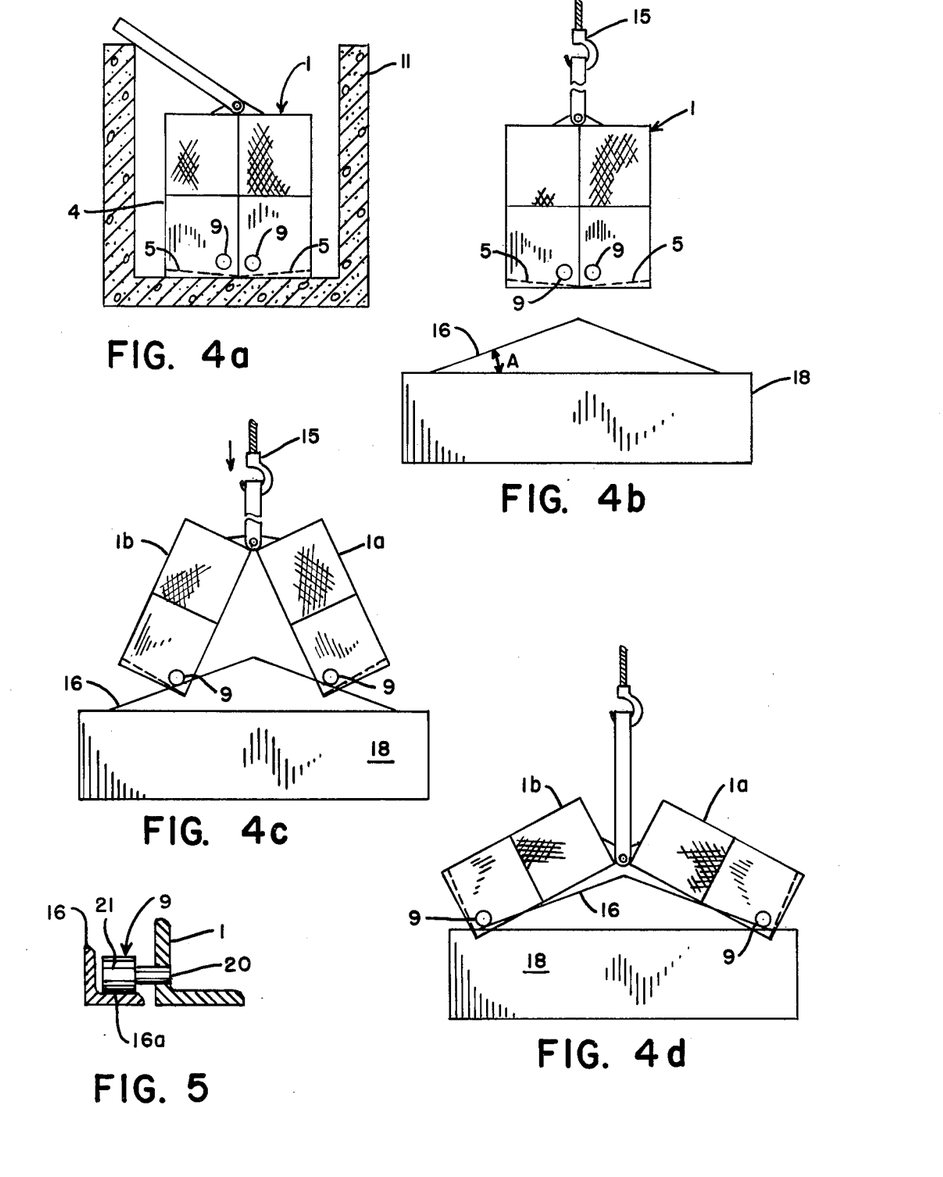
FIGS. 4a–4d illustrate the method of emptying the basket by means of the preferred cam and cam-following surfaces.
FIG. 5 is a more detailed view of a cam-following surface engaging a cam, shown in cross section.

Referring to the drawings, FIG. 1 shows the preferred embodiment of the strainer basket 1 in a partially opened position. The basket 1 comprises two sections, 1a and 1b, each attached to a suitable mounting means 2—for example, pivot pins 2a. The sections are adapted to abut together along mating edges to define an open container. In the preferred embodiments, each section comprises two opposed end walls 3, a side wall 4, and a bottom wall 5. The side walls 4 of each section and the upper portions 3b of the end walls 3 are perforate and may be formed, for example, of expanded metal, mesh screening or the like. It has been found desirable, as an aid to effective dumping of the debris from the basket, to employ imperforate bottom walls 5 that are inclined upwardly, at a small angle, toward side walls 4, as shown in FIG. 4a. Also, for reasons to be explained in connection with FIG. 9, it is advantageous to make the lower portions 3a of end walls 3 imperforate. However, it should be realized that other arrangements are feasible and within the scope of the invention.

For most installations, it is desirable that the basket is provided with a lifting means such as frame 7 that carries or is secured to basket sections 1a and 1b. The basket section mounting means preferably comprises a pair of aligned pins 2a, one at each end of the lifting frame 7, that are adapted to rotatably receive flanges 2b located on the upper inboard portion of the end walls 3 of each section. Suitable retaining means are employed to retain the flanges 2b axially on the pins 2a. Preferably, the lifting frame includes means adapted to be engaged by a hoist, for example, the pin 8 that extends between spaced portions of the lifting frame and that is easily engagable by the hook of a hoist. It is also contemplated that the frame 7 may comprise a part of the overhead hoisting arrangement that is detached from the basket while it is positioned to receive debris. The basket includes cam-follower means 9 preferably disposed on each of the end walls 3 of sections 1a and 1b, which cam followers are adapted to engage cam surfaces to rotate the sections from abutment, as will later be described.

Figure 1A:
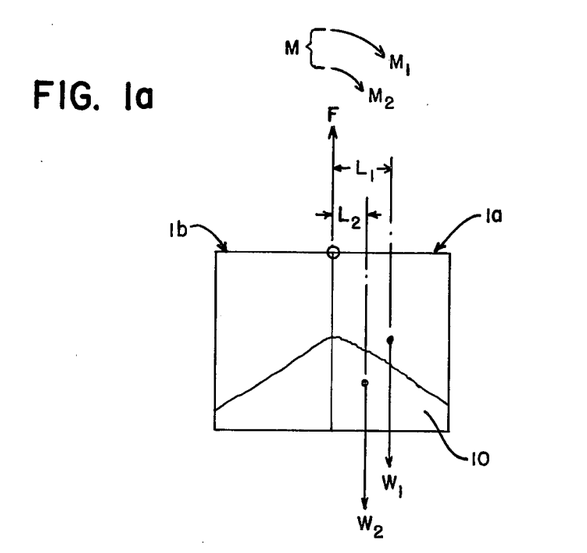
FIG. 1a illustrates the self-closing forces and moments acting on the straining basket due to the weight of the abutting sections and the material trapped therein.

Although the preferred embodiment is a rectangular parallelepiped, the sections may be adapted to form an open container of another shape; however, the sections preferably are configured so that, when the basket is supported from above, the sum of the moments on each section about its pivot axis, due to the weight of the section alone and of any material trapped therein, urges the section toward abutment with the other section. As shown more specifically in FIG. 1a, when the straining basket is supported by the lifting frame 7 alone, represented by force F, the sum of the moments on each section due to the weight of the section 1a, represented by a single force $W_1$ applied at its center of gravity, acting through lever arm $L_1$, and the weight of any material 10 trapped therein, represented by a single force $W_2$ applied at its center of gravity, acting on a lever arm $L_2$, urge the section 1a towards abutment with section 1b. As shown in FIG. 1a, the sum of the moments $M_1$ and $M_2$ acting on section 1a urge the section clockwise toward abutment. Likewise, the corresponding moments acting on section 1b urge it counterclockwise toward abutment with section 1a.

In the embodiment illustrated, the pivot axis for each of the sections 1a, 1b is coincident. However, it should be realized that such an arrangement is not necessary in order for the strainer basket to operate in accordance with the invention. The desired relationship is that the center of gravity of each section, either loaded or unloaded, be outboard—i.e., spaced laterally outward of—the pivot axis of the respective section, so that the basket sections are always biased, by moments arising from gravitational forces, toward each other and into abutting position. Biasing moments could also be generated by means of springs coactive between the sections or the sections and their supports.

Figure 2:
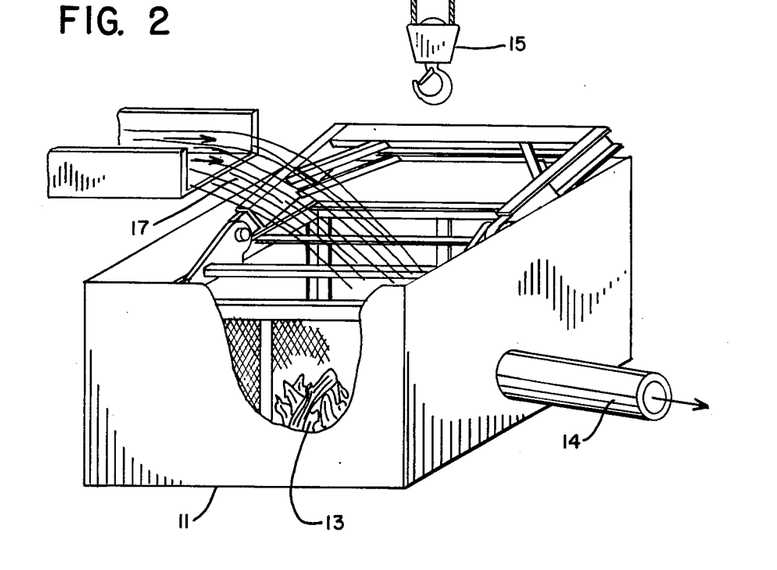
FIG. 2 schematically illustrates the straining basket in a pit.

The basket 1 is illustrated in operation in FIG. 2. When the strainer basket 1 is placed in a pit 11 and debris-laden water 12 is directed into its open top, via a suitable water-directing conduit, the debris 13 is trapped in the basket 1 while the water drains through the perforations in the basket walls and is drawn off through an outflow duct 14 and is thereafter utilized. When full of debris, the basket 1 may be lifted from the pit 11 by a hoist, crane or any other similar means 15 in preparation for emptying, and the basket will remain closed without the need for troublesome latches or other mechanical fasteners by reason of the closing moments previously described.

Figure 3:
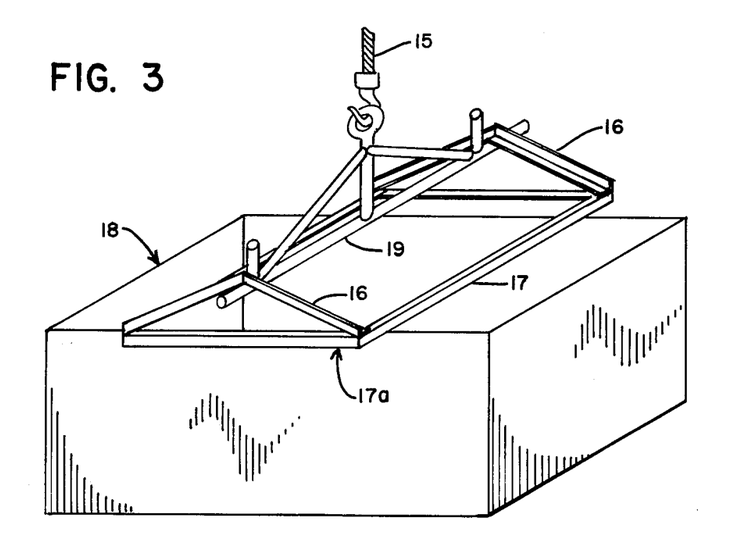
FIG. 3 illustrates the preferred cam and means for lifting and orienting it with respect to a debris receptacle in preparation for emptying a straining basket.

The preferred method of emptying the debris-filled basket is by engaging the cam-following means 9 as shown in FIG. 1 with a wedge-shaped cam as illustrated in FIG. 3. Two wedge-shaped cams 16, in the form of A-frames, are adapted to engage and drive apart the cam-following means 9 located on each end of the basket 1. The pair of A-frame cams 16 are mounted together for convenience by means of frame members 17 to form an assembly 17a easily positioned over a debris receptacle 18. To facilitate handling of the A-frame cam assembly, a pickup beam 19 is provided, adapted to catch hold of the apex of each A-frame cam 16 and to engage a hoist 15.

FIGS. 4a–4d illustrate the operation of a typical debris-collecting installation utilizing the basket of FIG. 1. FIG. 4a shows the basket 1 resting in a receiving means such as a pit 11 and positioned to receive debris-laden water. In FIG. 4b, the basket 1 has been lifted from the pit 11 by a hoist 15 and is suspended over the wedge-shaped cams 16 which are positioned so as to engage the cam-following means 9. As shown in FIGS. 4c and 4d, as the hoist 15 lowers the basket 1 so that the cam following surfaces 9 engage the cams 16, the cam followers 9 move apart, thereby causing the basket sections 1a and 1b to rotate apart from the abutting position, thus permitting the debris to fall into debris receptacle 18.

An advantage of the preferred emptying arrangement is that although the basket is self-closing when suspended by the hoist, the weight of the basket and contents aid the opening of the basket. That is, once the weight of the basket 1 and its contents bear upon the cam 16, the forces applied to the cam followers by the cam surfaces create moments which tend to urge the sections open.

When empty, the basket 1 is lifted from the cams 16 whereby the sections automatically return to the abutted position under the force of gravity, to the position shown in FIG. 4b. The straining basket 1 is ready to be replaced in the pit 11 and resume operation.

The preferred cam configuration to effect the opening described in connection with FIGS. 4a–4d is an A-frame 16 forming an isosceles triangle, having a base sufficiently long to accomodate the distance between the cam-following surfaces 9 when the sections are fully opened. Satisfactory results have been obtained using minor angles A of about 30°, although others may be usable depending upon the orientation of the cam-following surfaces, the degree of opening required, and the shape and orientation of the bottom walls of the basket sections.

FIG. 5 is a more detailed illustrating of the cam engaging a cam-following surface. The cam-following surface 9 attached to each section 1 comprises a pin 20 provided with an antifriction bearing 21, such as a roller or ball bearing. The A-frame cam 16, shown in cross section, is constructed of angle section material having a surface 16a on which the bearing 21 rides.

Figure 6:
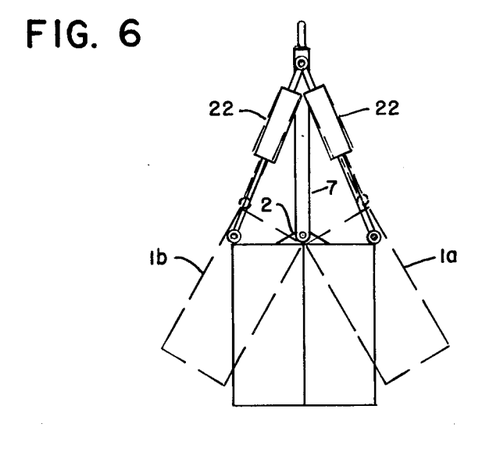
FIG. 6 illustrates another arrangement for emptying the basket using two fluid cylinders.

The advantages of the invention are manifold. The construction of the strainer basket is simple and durable. No latches are needed; thus, the clogging and freezing which plagues the prior art is eliminated. However, depending upon the requirements of the particular installation, other methods may be used to open the basket for emptying. For example, FIG. 6 illustrates the use of fluid cylinders 22, each attached at one end to a common fixed point, for example, near the top of the lifting frame 7, and attached at the other end to the respective outboard edges of the sections 1a and 1b. In this manner, when the debris-filled straining basket is positioned over the debris receptacle, the cylinders 22 may be activated to apply a force to the outboard edge of each section which creates a moment sufficient to overcome the self-closing moment due to the weight of the sections and the trapped debris, thus causing the sections to rotate and disengage from abutment, as shown in the dotted line position.

Figure 7:
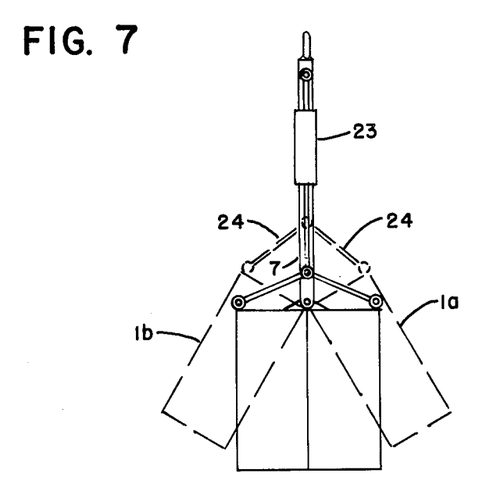
FIG. 7 illustrates another arrangement for emptying the basket using one fluid cylinder.

A similar system shown in FIG. 7 utilizes one cylinder 23 attached at a fixed point, for example, near the top of the lifting frame 7, and at the other to a pair of link members 24 which are pivotally attached to the respective outboard edge of each section. Thus, when the cylinder 23 is activated, the connecting members 24 pull the outer edges of the sections sufficiently to overcome the self-closing moment, thus rotating the sections as shown by the dotted line position.

Figure 11:
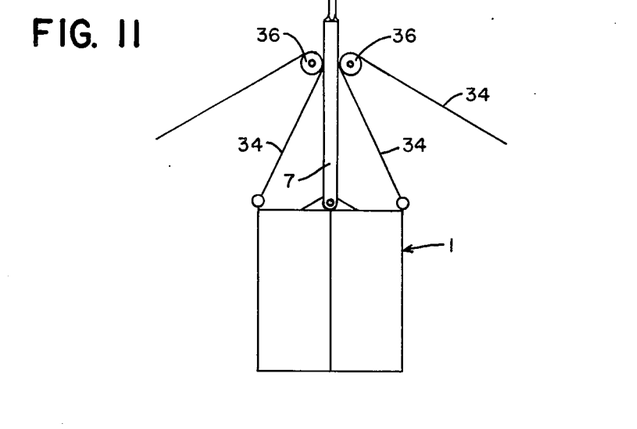
FIG. 11 illustrates a basket-opening arrangement employing cables and pulleys.
Figure 12:
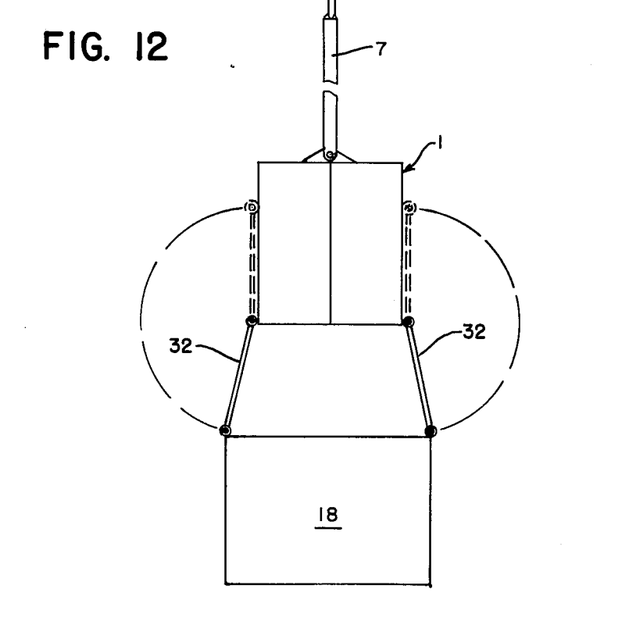
FIG. 12 illustrates a basket-opening system employing rigid links.

Still further methods of opening the strainer basket are possible. Cables may be attached to the outboard edge of each section by which the sections may be pulled from abutment. The cables may be adapted to be pulled from above, as by hoists, or may be passed over pulleys so as to be pulled from the side, as shown in FIG. 11. If, in the latter case, the cables 34 are attached to the ground and the pulleys 36 to the lifting frame 7, the raising or lowering of the basket itself will cause the cables to open and close the sections. Alternatively, pivoted links 32 pivotally attached to the sections and removably to fixed points beneath the basket, for example, on the debris receptacle, can be used for opening the basket, as shown in FIG. 12.

Figure 8:
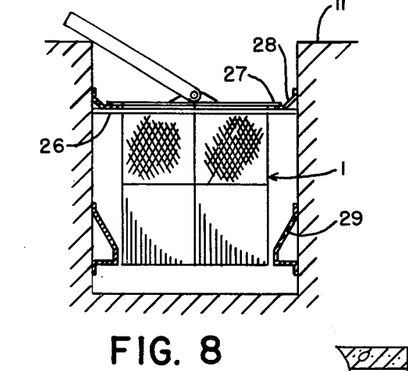
FIG. 8 is a more detailed view of the strainer basket positioned in a pit by supporting and centering frames.

FIG. 8 is a more detailed illustration of the pit 11 and various basket support features which may be incorporated therein as the particular installation requires. The pit 11 in which the strainer basket 1 rests during the straining operation is built into the ground to prevent freezing of the water and debris during cold weather.

As shown in FIG. 2, the basket 1 may rest on the floor of the pit 11; however, better performance may be achieved by supporting the basket 1 above the pit floor as shown in FIG. 8 so that the water may drain well under the bottom of the basket 1 and out of the pit. To this end, the basket may be supported by an upper frame 26 which engages a lip 27 provided around the top of the basket. Sealing means 28 are provided to prevent the inflow of debris and water from splashing over the sides of the basket during operation. Alternatively, if an upper frame were utilized, it could be adapted to function as sealing means. If the installation requires, guides 29 could be located on the pit walls to ensure that the basket is centered properly.

Figure 9:
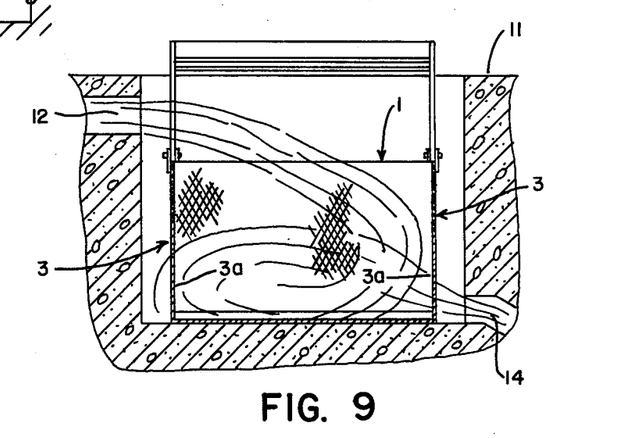
FIG. 9 is a schematic illustration of one arrangement of the strainer basket with respect to the water intake and exhaust ducts.

Although the invention has been described in relatively general terms regarding the physical orientation of the basket in the pit, the intake flows of debris and water, and the clean water drain-off, several refinements have been made in the system, resulting in substantial improvements in drainage efficiency. FIG. 9 is a side view of a more specific physical arrangement of debris and water intake flow 12, strainer basket 1, pit 11, and outflow passage 14. The debris and water are introduced in a manner so that the water impinges on an imperforate portion 3a of end wall 3. The basket drains more efficiently, i.e., with less water and debris splashing over the sides of the basket. In this arrangement, the solid portion of the end wall 3 deflects the incoming flow of water so as to improve the flow conditions in the basket and permit more efficient draining.

Figure 10:
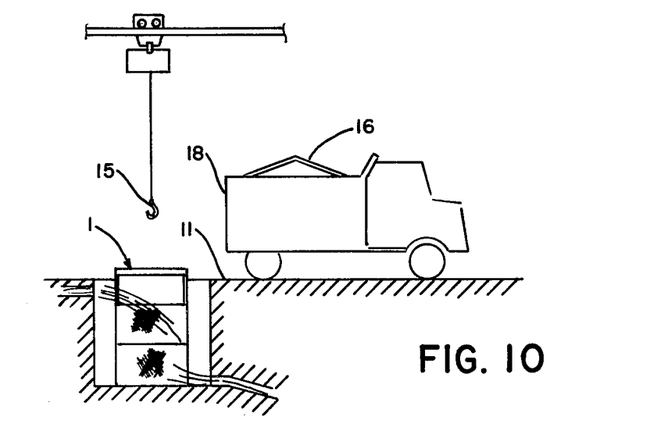
FIG. 10 illustrates a complete straining system including a straining basket and pit, a hoist, and an opening cam positioned over a debris receptacle.

The invention and its various apparatus could be incorporated into an integrated straining and debris-removing system as shown in FIG. 10. One such system includes a straining basket 1 received in a pit 11 having associated intake and drainage ducts, traveling overhead hoist 15, and opening cams 16 mounted on a debris receptacle 18, such as a dump truck. Also, a larger pit could accomodate two or more baskets installed so that one basket could remain in operation while the other is emptied, thus providing continuous service.

Debris disposal arrangements according to the invention can be associated integrally with the typical debris separation systems previously discussed. For example, the backwash water jets can discharge into short troughs that in turn discharge into the basket or the jets can discharge the debris directly into the basket.

While the foregoing description has been set in the environment of debris removal systems for power plants, it should be realized that the invention has potential applicability in many other industrial situations requiring separation of solids from a fluent stream and subsequent disposal of the solids.

I claim:

1. A debris disposal system comprising:
   a strainer having a plurality of cooperative sections adapted to abut together in mating relationship to define an open container, at least one of the sections including a perforate portion;
   means for pivotally mounting each section with respect to the other whereby they are free to rotatably disengage from abutment;
   each section configured so that, in abutment with each other, the net moment on the section about its pivot axis, due to the weight of the section alone and of any material contained therein, urges the sections toward abutment to a substantially closed position;
   means for operatively associating a lifting means with the strainer; and means for opening the sections by rotation of at least one of the sections out of abutment position with another of the sections comprising
  at least one cam-follower means mounted on the exterior of at least one of the strainer sections, and
  a cam for engagement by the cam-follower means, the cam being separate from and positionable remotely from the strainer in association with a debris container.

2. A strainer according to claim 1 in which the cam follower means comprises a pin mounted on the exterior of each of the sections, and in which the cam comprises a wedge-shaped A-frame.

3. A strainer according to claim 2 further comprising means for mounting the wedge-shaped A-frame over an open debris receptacle.

4. A straining system comprising:
a strainer having a plurality of cooperative sections adapted to abut together in mating relationship to define an open container, at least one of the sections including a perforate portion;
means for pivotally mounting each section with respect to the other whereby they are free to rotatably disengage from abutment;
each section configured so that, in abutment with each other, the net moment on the section about its pivot axis, due to the weight of the section alone and of any material contained therein, urges the sections toward abutment to a substantially closed position;
means for opening the sections by rotation of at least one of the sections out of abutment position with another of the sections comprising
  at least one cam-follower means mounted on the exterior of at least one of the strainer sections,
  a cam for engaging the cam-follower means, the cam being positionable remotely from the strainer in association with a debris container,
means for vertically moving the strainer, and
means for operatively associating the moving means to the strainer.

5. A straining system comprising:
a strainer having a plurality of cooperative sections adapted to abut together in mating relationship to define an open container, at least one of the sections including a perforate portion;
means for pivotally mounting each section with respect to the other whereby they are free to rotatably disengage from abutment;
each section configured so that, in abutment with each other, the net moment on the section about its pivot axis, due to the weight of the section alone and of any material contained therein, urges the sections toward abutment to a substantially closed position;
means for opening the sections by rotation of at least one of the sections out of abutment position with another of the sections comprising
  at least one cam-follower means mounted on the exterior of at least one of the strainer sections, and
  a cam for engaging the cam-follower means, the cam being separate from and positionable remotely from the strainer in association with a debris container;
a receptacle adapted to contain the strainer having at least one intake duct adapted to direct a stream of material-laden fluid into the interior of the strainer, the receptacle also having a fluid outlet;
means for moving the strainer vertically into and out of the receptacle; and
means for operatively associating the moving means with the strainer.

6. A straining system according to claim 5 in which the receptacle is an underground pit.

7. A debris collection system comprising:
a receiving means;
an open strainer adapted to be positioned in the receiving means;
fluid intake means for directing materialbearing fluid into the interior of the strainer;
means for carrying off fluid passing through the strainer from the receiving means;
the strainer including abutting, separable sections having opposed end walls and intervening side and bottom walls, and means mounting the sections for movement with respect to each other into and out of abutment;
means for biasing the sections into the abutting position;
means for overcoming the biasing means to separate the sections to dump the contents of the strainer, comprising cam-following means mounted on each of the separable sections of the strainer and cam means having surfaces for engaging the cam followers, the cam means being separate from and remotely positionable from the strainer in association with a debris container; and
means for operatively associating a lifting means with the strainer.

8. A system as in claim 7 and further comprising means for moving the strainer vertically.

9. A system as in claim 1 wherein the strainer includes an end wall, at least a portion of which is imperforate, the end being disposed opposite the fluid intake means.

10. A straining system comprising:
a strainer having a plurality of cooperative sections adapted to abut together in mating relationship to define an open container, at least one of the sections including a perforate portion;
the strainer including abutting, separable sections having opposed end walls and intervening side and bottom walls, and means mounting the sections for movement with respect to each other into and out of abutment;
means for biasing the sections of the strainer to the closed position;
means for opening the sections comprising cam-following means mounted on each of the separable sections of the strainer and cam means having surfaces for engaging the cam following means to cause relative separation thereof, the cam means being separate from and remotely positionable from the strainer in association with a debris container; and
means for operatively associating the strainer with a means for lifting the strainer.

11. Apparatus as in claim 10 wherein at least one of the sections has an end wall, a portion of which is imperforate.

12. Apparatus as in claim 10 wherein the means for associating the strainer with a lifting means comprises a frame from which the separable sections of the strainer depend, the separable sections being pivotally mounted on opposed ends of the frame.

13. Apparatus as in claim 10 wherein the cam means comprises an opposed pair of "A"-shaped wedge members mounted on a frame with the apices of the wedge members disposed upwardly and the frame being configured to be received on a debris container.

* * * * *

UNITED STATES PATENT AND TRADEMARK OFFICE
CERTIFICATE OF CORRECTION

PATENT NO. : 4,189,386

DATED : Feb. 19, 1980

INVENTOR(S) : Arcadio J. Aman

It is certified that error appears in the above-identified patent and that said Letters Patent are hereby corrected as shown below:

In the Abstract: penultimate line, "bellow" should be --below--.

Column 1, line 61, "." should be --,--.

Column 5, line 14, "illustrating" should be --illustration--.

(Claim 9) Column 8, line 31, "1" should be --7--.

Signed and Sealed this

Tenth Day of June 1980

[SEAL]

Attest:

SIDNEY A. DIAMOND

Attesting Officer

Commissioner of Patents and Trademarks